Jan. 8, 1929.                                           1,698,207
H. VAN GELDER
COMBINED BUMPER AND SHOCK ABSORBER
Filed April 14, 1927          3 Sheets-Sheet 1
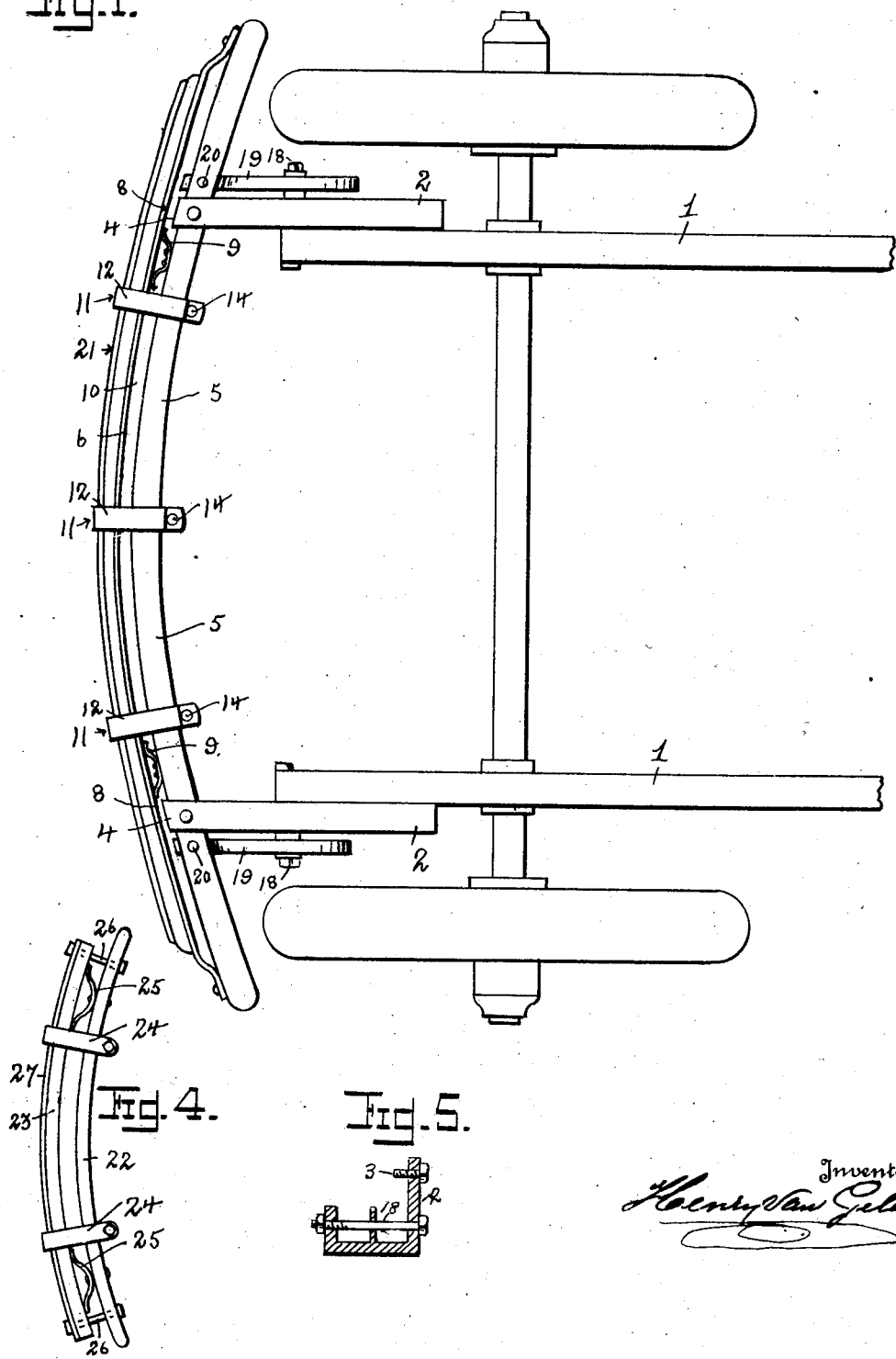
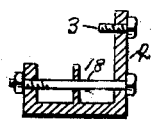
Inventor
Henry Van Gelder Jan. 8, 1929.
H. VAN GELDER
1,698,207
COMBINED BUMPER AND SHOCK ABSORBER
Filed April 14, 1927   3 Sheets-Sheet 2
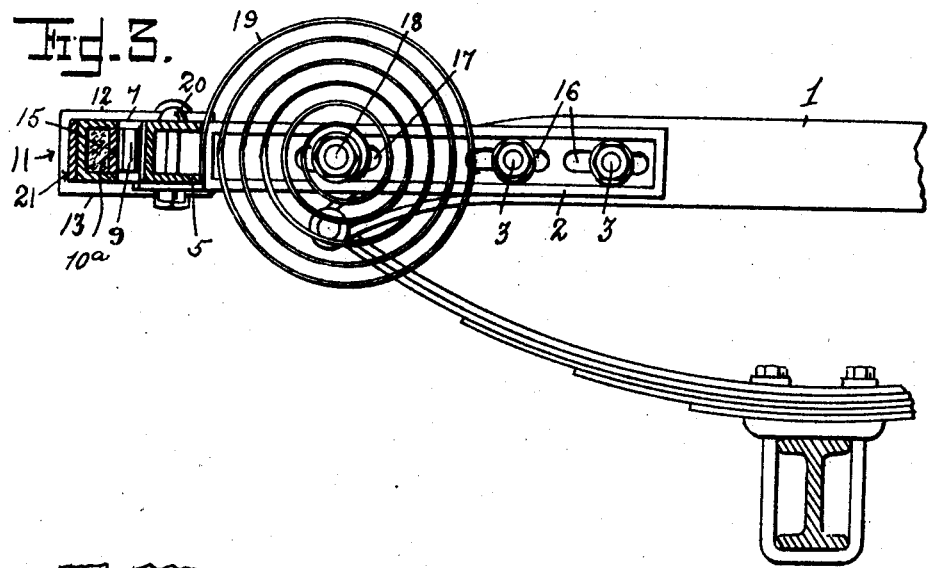
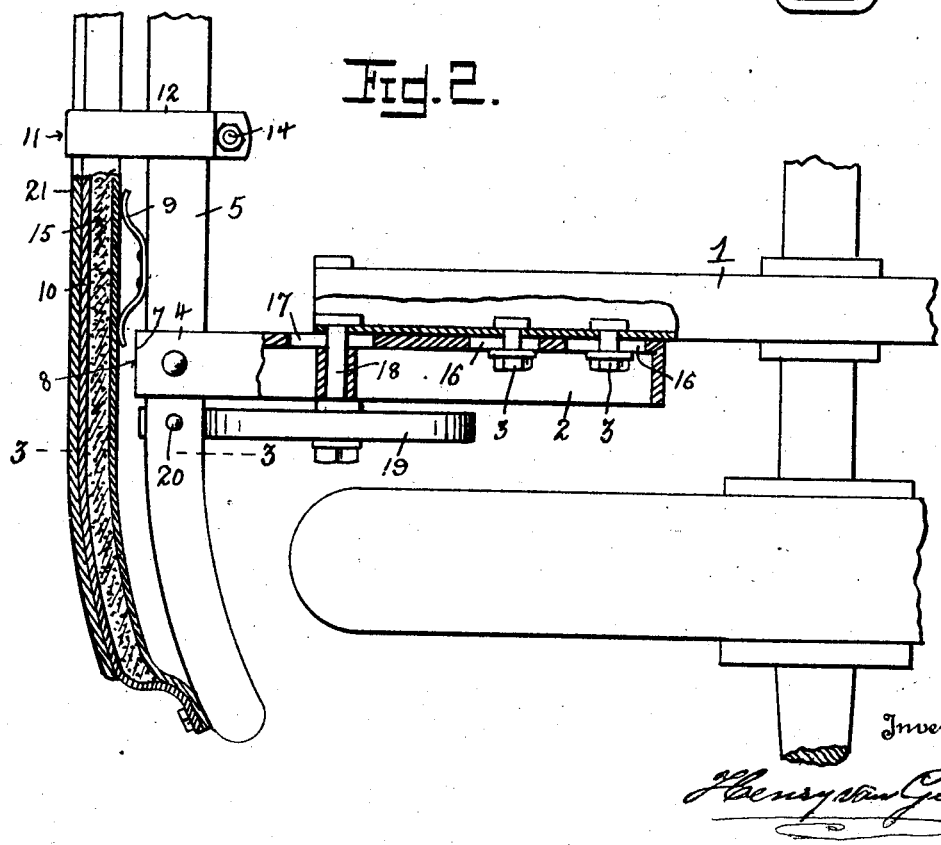
Inventor
Henry van Gelder Jan. 8, 1929.
H. VAN GELDER
1,698,207
COMBINED BUMPER AND SHOCK ABSORBER
Filed April 14, 1927    3 Sheets-Sheet 3
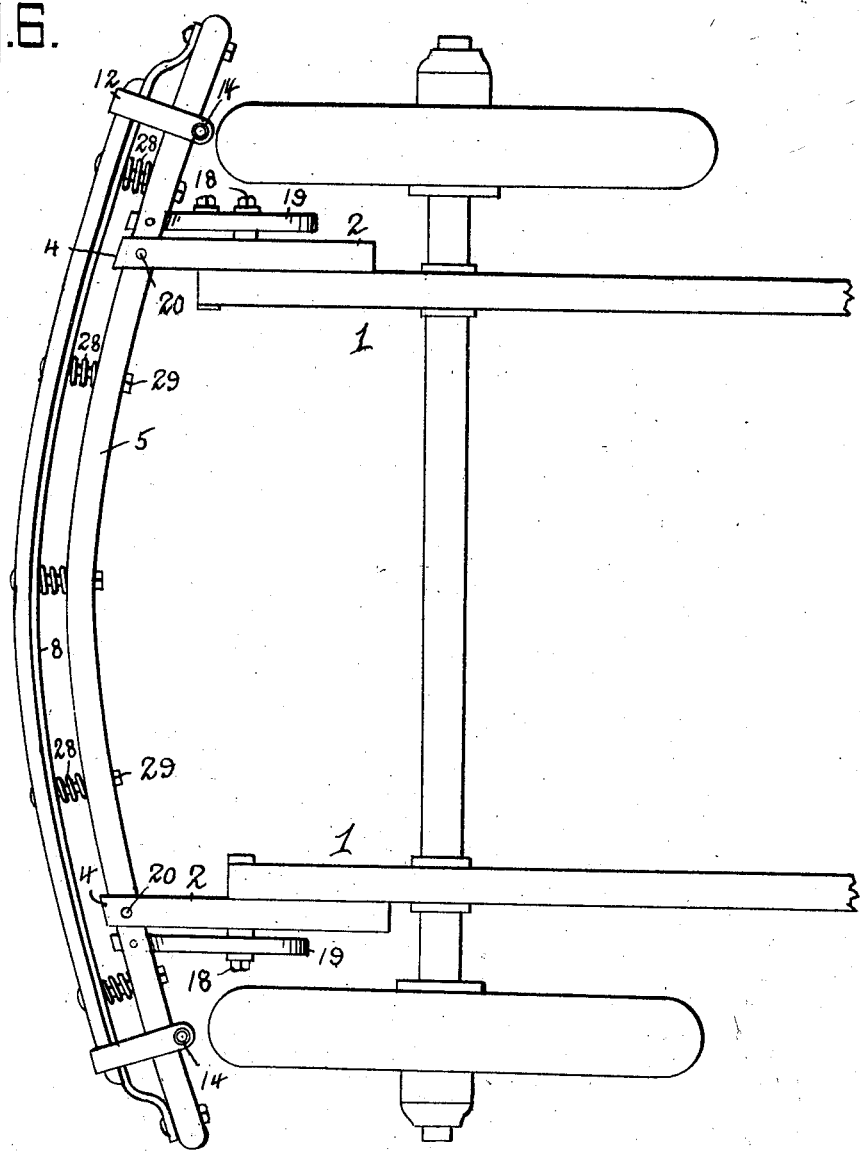
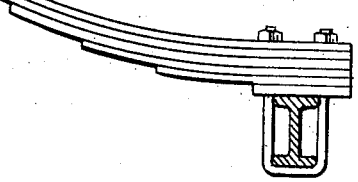

Patented Jan. 8, 1929.

1,698,207

UNITED STATES PATENT OFFICE.

HENRY VAN GELDER, OF JERSEY CITY, NEW JERSEY.

COMBINED BUMPER AND SHOCK ABSORBER.

Application filed April 14, 1927. Serial No. 183,837.

This invention relates to combined bumpers and shock absorbers for motor vehicles, and has for an object to provide a bumper designed to absorb shocks.

Another object is to provide a bumper in which a plurality of spring members are in alinement and are separated by further spring members thereby absorbing any shock at various points.

With these and other objects in view, I have invented an improved bumper for motor vehicles, illustrated in the accompanying drawings, in which:

Figure 1 is a top plan view of my invention in operative position;

Figure 2 is a top plan view of a portion of my invention, partly in section;

Figure 3 is a side elevation in section on the line 3—3 of Figure 2;

Figure 4 represents a modification in the construction;

Figure 5 represents a modified construction of one of the brackets used when a double frame is employed;

Figure 6 is a view, similar to Figure 1, illustrating a modification in the construction;

Figure 7 illustrates a modified means for attaching the bearing springs to the frame.

Like reference characters indicate like parts throughout the following specification and in the several views in the drawings, in which 1 represents the frame of a motor vehicle and 2 represents a pair of brackets secured to said frame by means of bolts 3. Each of said brackets 2 is provided with a U-shaped claw or pocket 4, into which is seated the rearward spring bar 5. A plurality of semi-elliptical leaf springs 9 are bolted to the forward side of the rearward spring bar 5 and to the rearward side of a forward spring bar 10. A plurality of clamps 11 extend around the spring bars 5 and 10, transversely of said spring bars, the forward bar 10 being supported by and slidable within said clamps 11. When the forward spring bar 10 is moved rearwardly, due to impact with some object, it is resisted by the leaf springs 9, and is returned to normal position by the reaction of the same upon the cessation of the rearwardly imparting force.

The clamps 11 are formed of a pair of integral spaced apart plates 12 and 13, the forward ends of the clamps being connected to the bar 10, the rear ends being slidable over the bar 5, being held against displacement therefrom by means of bolts 14 which connect the rear ends of said plates 12 and 13. The bar 10 is provided with an outer lining 21 of rubber, leather or any other suitable bumper material. The member 10 is hollow and is filled with any suitable resilient (such as rubber) filling, indicated at 15 which is held in place by a long leaf spring 10$^a$.

Each of the brackets 2 is provided with longitudinally directed slots 16 where the bolts 3 pass, so that the brackets are movable longitudinally of the frame 1 the length of the slots.

Another longitudinally directed slot 17 is formed through each bracket, and a stud 18 extends through each of the latter slots and is rigidly connected in the frame 1, as shown.

A spiral spring 19 is coupled at the inner end to each of the studs 18 and bent around the adjacent portion of the main bar 5 and bolted thereto as at 20.

The springs 19 thus operate as shock absorbers, as will be obvious.

A wear strip 21, preferably of brass or the like, may be attached to the outer face of the member 10 in lieu of the rubber or leather strip before mentioned, as shown.

In Figure 4 a modification in the construction is shown, including an inner or base bar 22 corresponding to the bar 5, and an outer bar 23, movably coupled to the bar 22 by clips 24, corresponding to the clips 12.

The outer bar 23 is yieldably supported by springs 25 corresponding to the springs 9, and further supported by stop bolts 26, and likewise provided with a wear strip 27.

In Figure 5, a modified form of the bracket is shown, which will be employed on double frame vehicles.

In Figure 6 a slight modification in the construction is shown consisting in substituting coiled springs 28 and guide bolts 29 for the leaf springs 9, between the members 5 and 6, at requisite intervals.

In Figure 7 another modification is shown consisting in attaching the bearing springs directly to the frame 1 by a vertical bolt 30 instead of by a lateral bolt.

Having thus described my invention, that which I claim as new, and desire to protect by Letters Patent, is:

1. In a combined bumper and shock absorber for motor vehicles, a plurality of spring bars and a plurality of spring elements separating said spring bars, said spring bars being in horizontal alinement and flat spiral springs through which said bumper is connected to a vehicle.

2. A combined bumper and shock absorber for motor vehicles, including a spring bar attachable to the frame of the vehicle, a buffer in horizontal alinement with said spring bar, and a plurality of clamps extending transversely around said buffer and spring bar, said buffer being supported by and slidable within said clamps.

3. In a combined bumper and shock absorber for motor vehicles, a spring bar, means for attaching said spring bar to the frame of the vehicle, a buffer in horizontal alinement with said spring bar, a plurality of clamps extending transversely around said buffer and spring bar, said buffer being supported by and slidable within said clamps, means for preventing lateral movement of said buffer, and means for resisting any rearward movement of said bumper.

4. In a device of the character described a bumper, brackets for supporting the same and flat spiral springs to which said brackets are connected.

5. In a device of the character described a bumper, brackets for supporting the same and flat spiral springs to which said brackets are connected, said brackets being movable.

6. In a device of the character described a bumper, brackets for supporting the same and flat spiral springs to which said brackets are connected, said brackets being movable, the movement of said brackets being controlled by said springs.

7. In a device of the character described a bumper, brackets for supporting the same and spiral springs to which said brackets are connected, said brackets being movable, the movement of said brackets being controlled by said springs, said brackets having slots and bolts carried by the frame of a car operating in said slots.

8. In a device of the character described a bumper, brackets for supporting the same and spiral springs to which said brackets are connected, said brackets being movable, the movement of said brackets being controlled by said springs, said brackets having slots and bolts carried by the frame of a car operating in said slots, and a buffer mounted in front of said bumper.

9. In a device of the character described a bumper, brackets for supporting the same and spiral springs to which said brackets are connected, said brackets being movable, the movement of said brackets being controlled by said springs, said brackets having slots and bolts carried by the frame of a car operating in said slots, a buffer mounted in front of said bumper, and springs supporting said bumper and buffer.

10. In a device of the character described a bumper, brackets for supporting the same and spiral springs to which said brackets are connected, said brackets being movable, the movement of said brackets being controlled by said springs, said brackets having slots and bolts carried by the frame of a car operating in said slots, a buffer mounted in front of said bumper, and springs supporting said bumper and buffer, said buffer being held extended from the bumper by said last springs.

11. In a device as described a plurality of horizontally aligned spring bars, said bars being relatively movable, clamps embracing said bars, means for holding said bars normally spaced apart, movable means for supporting said bars, said last means consisting of brackets, and spiral springs normally holding said bars and brackets extended.

12. In a device as described, a bumper, movable brackets on which the bumper is supported, and springs normally holding the brackets and bumper extended, a plurality of parallel spring bars forming said bumper.

13. As claim 12, and said bars being relatively movable.

14. As claim 12, and said bars being relatively movable, and means for holding said bars in adjustment.

15. As claim 12, and said bars being relatively movable, means for holding said bars in adjustment, and means for holding said bars normally spaced apart.

In testimony whereof I affix my signature in the presence of two witnesses.

HENRY VAN GELDER.